US007761219B2

(12) United States Patent
Loeffler et al.
(10) Patent No.: US 7,761,219 B2
(45) Date of Patent: Jul. 20, 2010

(54) METHOD AND DEVICE FOR CONTROLLING A SELF-IGNITING INTERNAL COMBUSTION ENGINE

(75) Inventors: Axel Loeffler, Backnang (DE); Juergen Haering, Stuttgart (DE); Wolfgang Fischer, Gerlingen (DE); Roland Karrelmeyer, Bietigheim-Bissingen (DE); Gerald Graf, Remseck (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/313,479

(22) Filed: Nov. 19, 2008

(65) Prior Publication Data

US 2009/0182483 A1 Jul. 16, 2009

(30) Foreign Application Priority Data

Jan. 15, 2008 (DE) ....................... 10 2008 004 360

(51) Int. Cl.
*G06F 19/00* (2006.01)
*F02D 41/26* (2006.01)

(52) U.S. Cl. ..................................................... 701/103

(58) Field of Classification Search ................. 123/435, 123/305; 701/103–105, 101, 102, 106
See application file for complete search history.

(56) References Cited

U.S. PATENT DOCUMENTS

| | | | | |
|---|---|---|---|---|
| 7,076,360 | B1 * | 7/2006 | Ma | 701/103 |
| 7,532,971 | B2 * | 5/2009 | Sasaki et al. | 701/102 |
| 2007/0157599 | A1 * | 7/2007 | Gaertner | 60/274 |
| 2008/0289603 | A1 * | 11/2008 | Konakawa | 123/406.26 |
| 2009/0182482 | A1 * | 7/2009 | Loeffler et al. | 701/103 |

FOREIGN PATENT DOCUMENTS

| | | | |
|---|---|---|---|
| JP | 2007-85304 | * | 4/2007 |
| JP | 2009-168029 | * | 7/2009 |

* cited by examiner

*Primary Examiner*—Hai H Huynh
(74) *Attorney, Agent, or Firm*—Kenyon & Kenyon LLP

(57) ABSTRACT

A method for controlling a self-igniting internal combustion engine includes: specifying a target combustion position; determining at least one actual combustion position of at least one cycle of the internal combustion engine; specifying a computing model for calculating a following combustion position as a function of the at least one actual combustion position; calculating the following combustion position using the computing model; comparing the calculated following combustion position with the specified target combustion position; and determining at least one operating quantity for operating the internal combustion engine for at least one cycle as a function of the comparison of the calculated following combustion position with the specified target combustion position.

24 Claims, 6 Drawing Sheets

METHOD AND DEVICE FOR CONTROLLING A SELF-IGNITING INTERNAL COMBUSTION ENGINE

BACKGROUND OF THE INVENTION

1. Field of the Invention

The present invention relates to a method and a control device for controlling a self-igniting internal combustion engine.

2. Description of Related Art

Self-igniting combustion methods, also known as HCCI methods (Homogenous Charge Compression Ignition) or CAI methods (Controlled Auto Ignition), are distinguished by an economical consumption of fuel, in particular in partial load situations, and by relatively low raw pollutant emissions. Thus, in a self-igniting internal combustion engine it is possible to do without an additional, relatively expensive exhaust gas aftertreatment, for example using a NOx storage catalytic converter.

In a self-igniting combustion method, the fuel injected into the internal combustion engine is mixed with hot exhaust gases and is then automatically ignited during a compression. This results in a relatively low combustion temperature, with a large number of exothermic centers in the combustion chamber, and thus to a very uniform and rapid combustion.

As a rule, self-igniting engines are equipped with direct gasoline injection. In addition, self-igniting engines have a variable valve system. A distinction is made between fully variable valve systems, for example having an electrohydraulic valve controlling, and partially variable valve systems, which can be realized by a camshaft-controlled valve operation. The latter is the more economical alternative.

In order to execute a self-igniting combustion method, a particular quantity of exhaust gas is held back in the cylinder or is recirculated back into the cylinder and is used for the initiation of the combustion during the compression phase. One speaks here of an internal or an external exhaust gas quantity. The internal exhaust gas quantity is held back in the cylinder by a negative valve overlap. In contrast, the external exhaust gas quantity can be fed back or can be suctioned back by a brief opening of the outlet valve during the intake phase.

In a self-igniting combustion method, however, the direct trigger in the form of an external ignition for the initiation of the combustion is not present. The position of the combustion, which is often called the combustion position, can therefore be influenced only by a carefully adjusted controlling of the CAI engine system. In order to determine the combustion position, a measurement value is often used that is determined via a cylinder pressure sensor. For example, this measurement value relates to a specific energy conversion point that is given as a rule by a crank angle. One often speaks here of a center of combustion MFB50 (mass fraction burned 50%).

As a rule, CAI combustion methods include a cycle-to-cycle correlation with a particular temperature, on the basis of the internal and/or external exhaust gas quantity coming from the previous cycle. For example, a premature combustion results in a slight decrease in the temperature of the internal and/or external exhaust gas quantity in the following cycle. This retards the combustion, and therefore often results in a late combustion. As a result, the temperature of the internal and/or external exhaust gas quantity in the next cycle may be too high, and may again cause a premature combustion that occurs even earlier than the previous premature combustion. Deviations of the combustion position relative to a target combustion position may continue to increase in this way until the combustion comes to a complete halt. In particular in low-load operation, close to no-load operation, the risk of a failure of combustion is relatively great.

In addition, a very late position may also be accompanied by incomplete combustion. In the subsequent intermediate compression, there is then the risk that the HC/CO molecules that did not react in the previous cycle will react exothermically with the remaining oxygen. This often results, in the next combustion, to a significantly early and loud combustion, due to the increased temperature of the internal and/or external exhaust gas quantity.

Therefore, it would be desirable to have the possibility of ensuring a reliable maintenance of a desired target combustion position during operation of a self-igniting internal combustion engine.

BRIEF SUMMARY OF THE INVENTION

The present invention provides specifying a computing model with which a following combustion position of a future combustion cycle can be calculated on the basis of a determined actual combustion position. One speaks here of a calculation of the following combustion position in stationary CAI engine operation for the following (future) cycle, under the condition that an actual combustion position for the currently occurring (present) cycle is known. On the basis of the actual combustion position of the present cycle, the combustion position can then be predicted for the following cycle (following combustion position).

In this way, it is possible to recognize already before a cycle whether the probable combustion position of this cycle (the following combustion position) agrees with the prespecified target combustion position. This offers the possibility of correcting the combustion position of the cycle via the at least one operating quantity before a beginning of this cycle. In this connection, it is also possible to speak of a predictive controlling. In particular, in this way it is possible to recognize and prevent a probable failure of combustion in a timely manner.

The term combustion position is to be understood as referring to a feature for describing the combustion taking place in the internal combustion engine. For example, such a combustion feature can be acquired by a pressure sensor. Such a combustion feature is for example an energy conversion point, such as the already-named combustion center MFB50. The combustion position can also be a beginning and/or a duration of the combustion. The combustion position can be indicated by a crank angle.

An object of the present invention is to equalize the naturally occurring cycle-to-cycle fluctuations in the combustion position, thus fundamentally stabilizing the combustion. In addition, the present invention ensures that in each cycle the combustion position will be close to the applied target value, so that the desired relations of combustion, raw pollutant emissions, and combustion noise are ensured. In particular, therefore, the present invention enables the CAI operating range to be expanded to operating points that would otherwise exhibit instability.

In an example embodiment, at least one initial value is specified for the at least one operating quantity and on the basis of the determined actual combustion position and the at least one initial value for the at least one operating quantity, the following combustion position is calculated using the specified computing model. In this way, an initial value for the at least one operating quantity that is estimated to be advantageous can be tested for the controlling of the internal combustion engine.

Preferably, to the extent that the calculated following combustion position is situated within a specified range of deviation around the target combustion position, the internal combustion engine is operated for the at least one cycle with maintenance of the at least one initial value. In addition, as long as the calculated following combustion position is situated outside the specified range of deviation around the target combustion position, at least one new value is determined for the at least one operating quantity, and the internal combustion engine is operated for the at least one cycle with maintenance of the at least one new value. The internal combustion engine is thus continuously controlled with an operating quantity whose suitability is monitored. In particular, in this way a correction can be carried out of a future deviation of the combustion position from the target combustion position.

In an example embodiment, the at least one operating quantity is an injector control quantity, an air intake valve control quantity, and/or an exhaust gas valve control quantity. For example, the at least one operating quantity is an injection position (start of main injection, or start of pilot injection), a main injection quantity, a pre-injection quantity, and/or a quotient of the pre-injection quantity and the main injection quantity (quantity of pilot/main injection). Likewise, the at least one operating quantity can also be an opening and/or closing time of an air intake valve or of an exhaust gas valve. In addition, the at least one operating quantity can be an internal and/or external remaining gas quantity. The operating quantities listed here are suitable individually or in combination with one another for influencing the combustion position. It is also possible to influence the combustion position for each cylinder individually using the named operating quantities.

In accordance with the present invention, an engine state quantity and/or a fuel state quantity is determined, and on the basis of the determined actual combustion position and the determined engine state quantity and/or fuel state quantity, the following combustion position is calculated using the specified computing model. As an alternative, or in addition thereto, an environmental parameter, preferably an ambient temperature, can be determined, and on the basis of the determined actual combustion position and the determined environmental parameter the following combustion position can be calculated using the specified computing model. In this way, it is ensured that the calculated following combustion position corresponds to the current environmental and fuel conditions under which the internal combustion engine is being operated.

A corresponding control device is provided in accordance with the present invention, and the control device is designed to control the internal combustion engine for at least one cycle in such a way that the at least one determined operating quantity is maintained.

The self-igniting internal combustion engine can be a gasoline engine. The use of the predictively controlled CAI combustion method thus ensures an economical consumption of fuel and a relatively low raw pollutant emissions level.

DETAILED DESCRIPTION OF THE INVENTION

Figure 1:
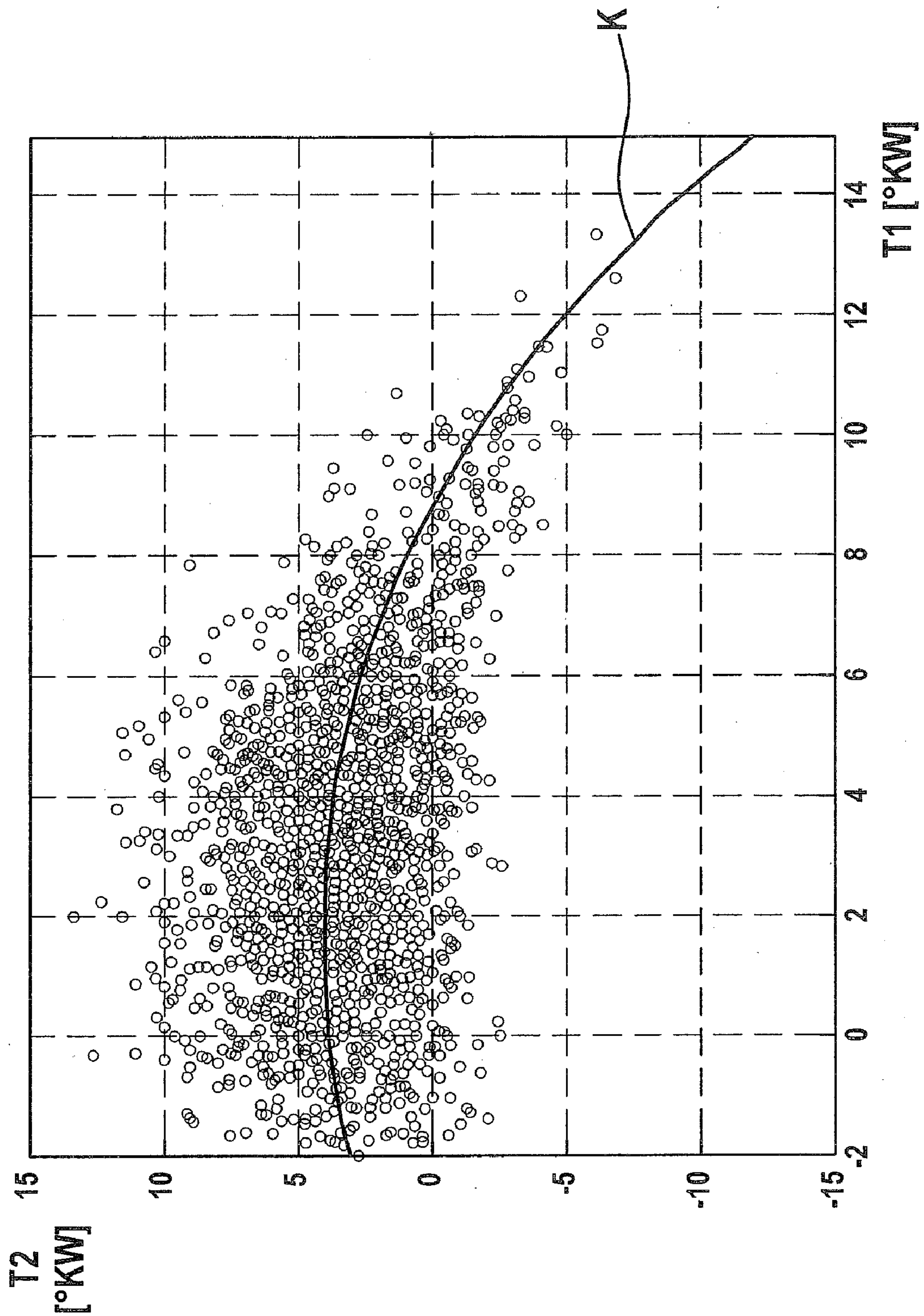
FIG. 1 shows a graph representing a cycle-to-cycle correlation between two successive combustion positions of a self-igniting internal combustion engine.

FIG. 1 shows a graph representing a cycle-to-cycle correlation between two successive combustion positions in a self-igniting internal combustion engine. Abscissa T1 indicates a determined combustion center (MFB50) of a first cycle in ° KW (crankshaft). Ordinate T2 indicates a determined combustion center (MFB50) of the second cycle (in ° KW or crankshaft) immediately following the first cycle. In both cases, 0° KW (crankshaft) corresponds to top dead center of the ignition.

The measurement points entered in the coordinate system are measured in stationary engine operation given a random variation of various control parameters. At top dead center of the ignition, no correlation can be seen between combustion centers T1 and T2. However, for the measurement points at which combustion center T1 is significantly above top dead center a cycle-to-cycle correlation K can be derived. Given relatively late combustion centers T1, cycle-to-cycle correlation K is approximately linear. For this reason, an occurrence of a late combustion position during the operation of the internal combustion engine can quickly result in unstable engine operation. For this reason, when the contribution of factor K is greater than one, this is referred to as a local instability.

Figure 2:
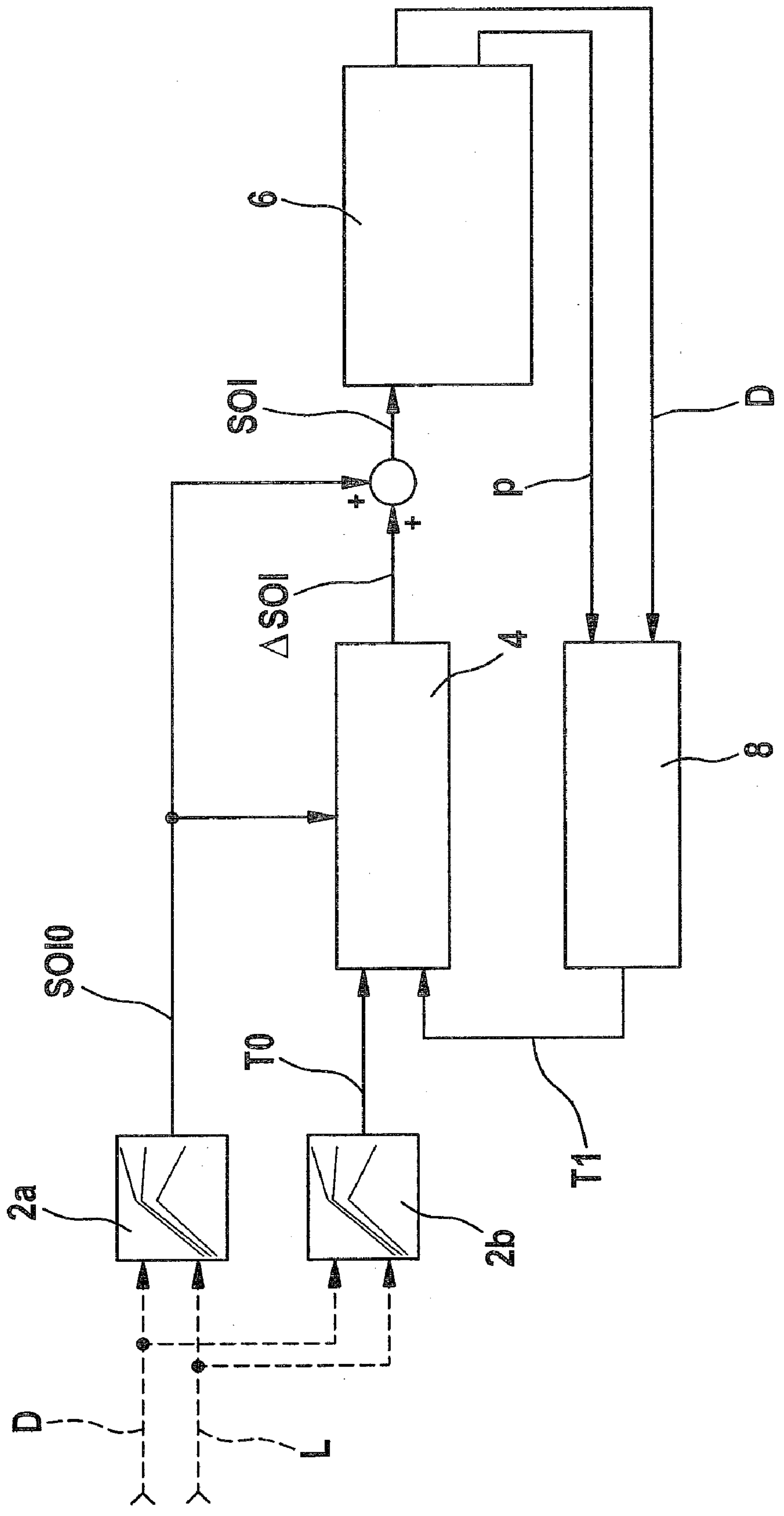
FIG. 2 shows a block diagram illustrating an example embodiment of the method according to the present invention for controlling a self-igniting internal combustion engine.

FIG. 2 shows a block diagram illustrating an example embodiment of the method according to the present invention for controlling a self-igniting internal combustion engine. The depicted method can potentially be used in control devices for self-igniting internal combustion engines, for example gasoline engines using CAI operation, having any number of cylinders.

Here, before the method is carried out, a computing model is specified that at each operating point reproduces the cycle-to-cycle correlation of the following combustion position in a qualitatively correct matter and with sufficient quantitative precision. Such a computing model can for example be what is known as a gray box model, based on physical regularities, with parameters adapted to the measurement data (physical control model). The computing model can also be a computing model identified exclusively on the basis of measurement data.

The computing model is preferably a model that is linear to a first approximation and whose parameters a, b, and c are stored in characteristic fields as a function of the operating point. For example, the model may be a nonlinear one (e.g., in FIG. 1 a quadratic dependence can be seen), but can be converted in the vicinity of an instability point by a model that is linear as a first approximation.

The computing model is then for example reproduced by the following equation:

$$T2=a\cdot T1+b\cdot SOI+c \quad \text{(Eq. 1)}$$

For example, the determined actual combustion position T1 of the currently running cycle and the following combustion position T2, calculated as the probable combustion position of the following cycle, are combustion centers. In this example, the injection position of the main injection (injection angle), indicated as a crank angle, is used as operating quantity SOI. However, a corresponding computing model can also be created for other combustion features and/or for additional or alternative operating quantities.

At the beginning of the method, a preset injection angle SOI0 and a target combustion position T0 are specified. This takes place for example using two separately situated subunits 2*a* and 2*b* of a presetting device. The provision of the preset injection angle SOI0 and of the target combustion position T0 can take place as a function of a rotational speed D and/or a load L.

Subsequently, the preset injection angle SOI0 and the target combustion position T0 are read in by a predictive controller 4. Predictive controller 4 outputs a correction value ΔSOI as a function of preset injection angle SOI0, target combustion position T0, and the measured actual combustion position T1. During a first run of the method, correction value ΔSOI is equal to zero. The precise functioning of predictive controller 4 and of correction value ΔSOI is described in more detail below.

Correction value ΔSOI is added to preset injection angle SOI0 to form an operating quantity SOI that is provided to a control system 6 for operating a self-igniting internal combustion engine. Control system 6 is designed to control an injector of the internal combustion engine in such a way that the provided operating quantity SOI is maintained for at least one cycle of the internal combustion engine as the injection angle. In addition, control system 6 includes a cylinder pressure sensor and a rotational speed sensor. A pressure curve p, measured by the cylinder pressure sensor, and a rotational speed D determined by the rotational speed sensor are continuously outputted to a combustion center determination device 8.

Combustion center determination device 8 is designed to determine an actual combustion position T1 on the basis of pressure curve p and rotational speed D. The determined actual combustion position T is then forwarded to the already-named predictive controller 4.

Predictive controller 4 calculates a following combustion position T2 on the basis of actual combustion position T1 and the likewise read-in preset injection angle SOI0, according to the above-indicated equation. Following combustion position T2 here corresponds to a probable combustion position of a (future) cycle that follows the executed cycle having actual combustion position T1. Subsequently, predictive controller 4 compares the calculated following combustion position T2 with target combustion position T0. If predictive controller 4 determines a deviation between following combustion position T2 and target combustion position T0, then it determines correction value ΔSOI taking into account preset injection angle SOI0 and the cycle-to-cycle correlation. In this way, correction value ΔSOI is used to adapt the combustion position of the following cycle to target combustion position T0. This takes place for example using the following equation:

$$\Delta SOI = \text{Function}(T2 - T0) \quad \text{(Eq. 2)}$$

Correction value ΔSOI determined in this way is subsequently again added to preset injection angle SOI0, yielding operating quantity SOI. The described process can be repeated as many times as necessary.

In a development, predictive controller 4 can be designed so that it takes into account a plurality of previous actual combustion positions T1 in the calculation of a following combustion position T2. For example, the calculation of following combustion position T2 then takes place based on actual combustion positions T1 of the current cycle and of the next-to-last cycle.

The method sketched in FIG. 2 can of course also be carried out for each cylinder individually. In this case, the pressure sensors (not shown) are designed to acquire the pressure curve p in each of the various cylinders individually. Controlling of correction value ΔSOI then takes place individually for each cylinder.

Figure 3:
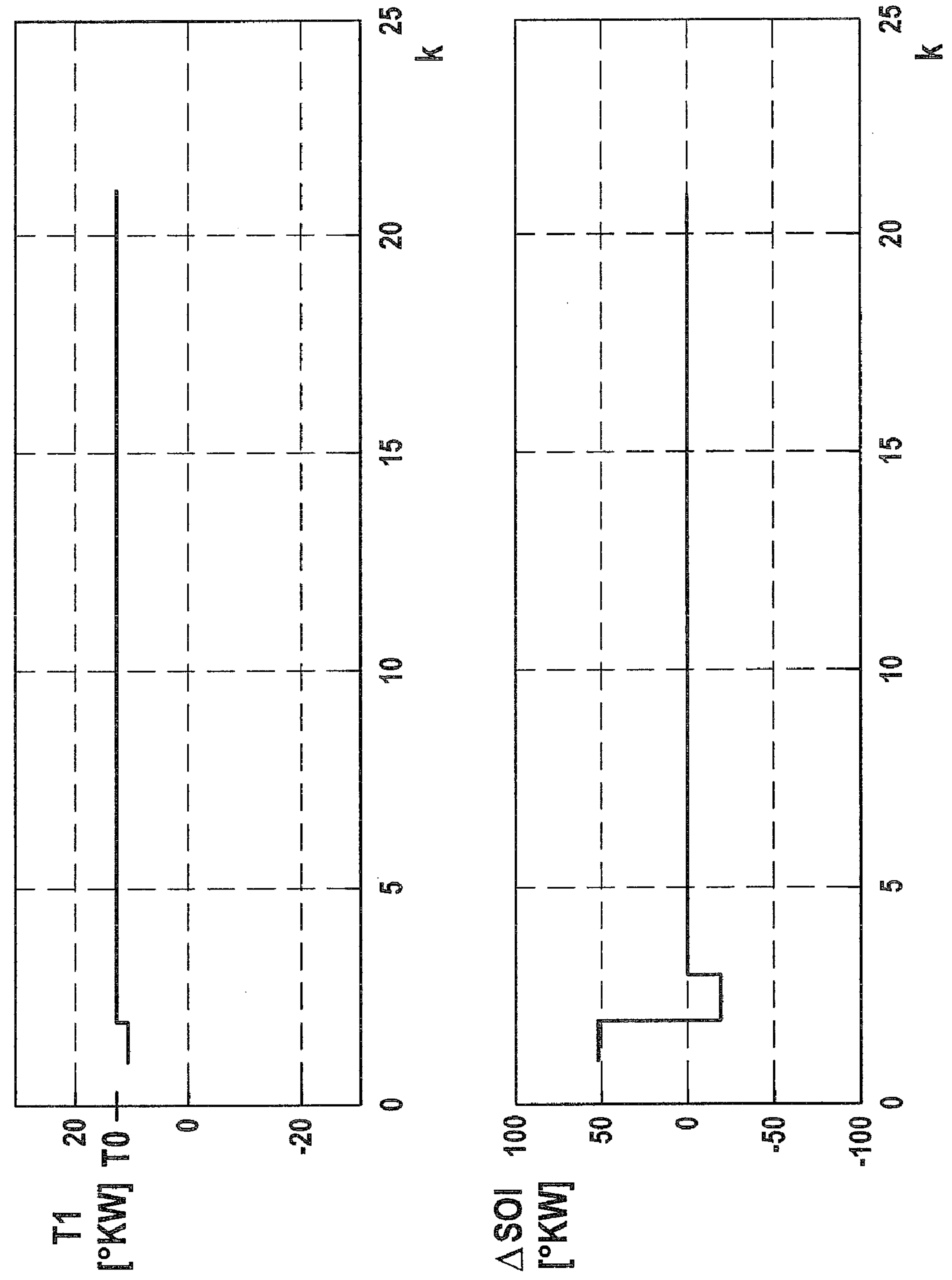
FIG. 3 shows two graphs representing the effects of the example embodiment of the method illustrated in FIG. 2.

FIG. 3 shows two graphs representing the effects of the example embodiment of the method illustrated in FIG. 2. Here, the abscissas of the coordinate systems each indicate cycles k. The ordinates correspond to a determined actual combustion position T1 and to a correction value ΔSOI of the injection angle of the respective cycle k.

Here it can be seen that with the aid of the method of FIG. 2, actual combustion position T1 within a cycle k can be controlled to prespecified target combustion position T0. During the following cycles k, target combustion position T0 is held constant through actual combustion position T1. The method of FIG. 2 thus ensures a reliable possibility for controlling an actual combustion position T1 to a desired target combustion position T0 during operation of a self-igniting internal combustion engine. Correction value ΔSOI required for this deviates from zero only for a few cycles k. In the method shown, the setting of actual combustion position T1 to target combustion position T0 is possible with a minimal corrective expense, and with only a few interventions in the controlling of the internal combustion engine.

Figure 4:
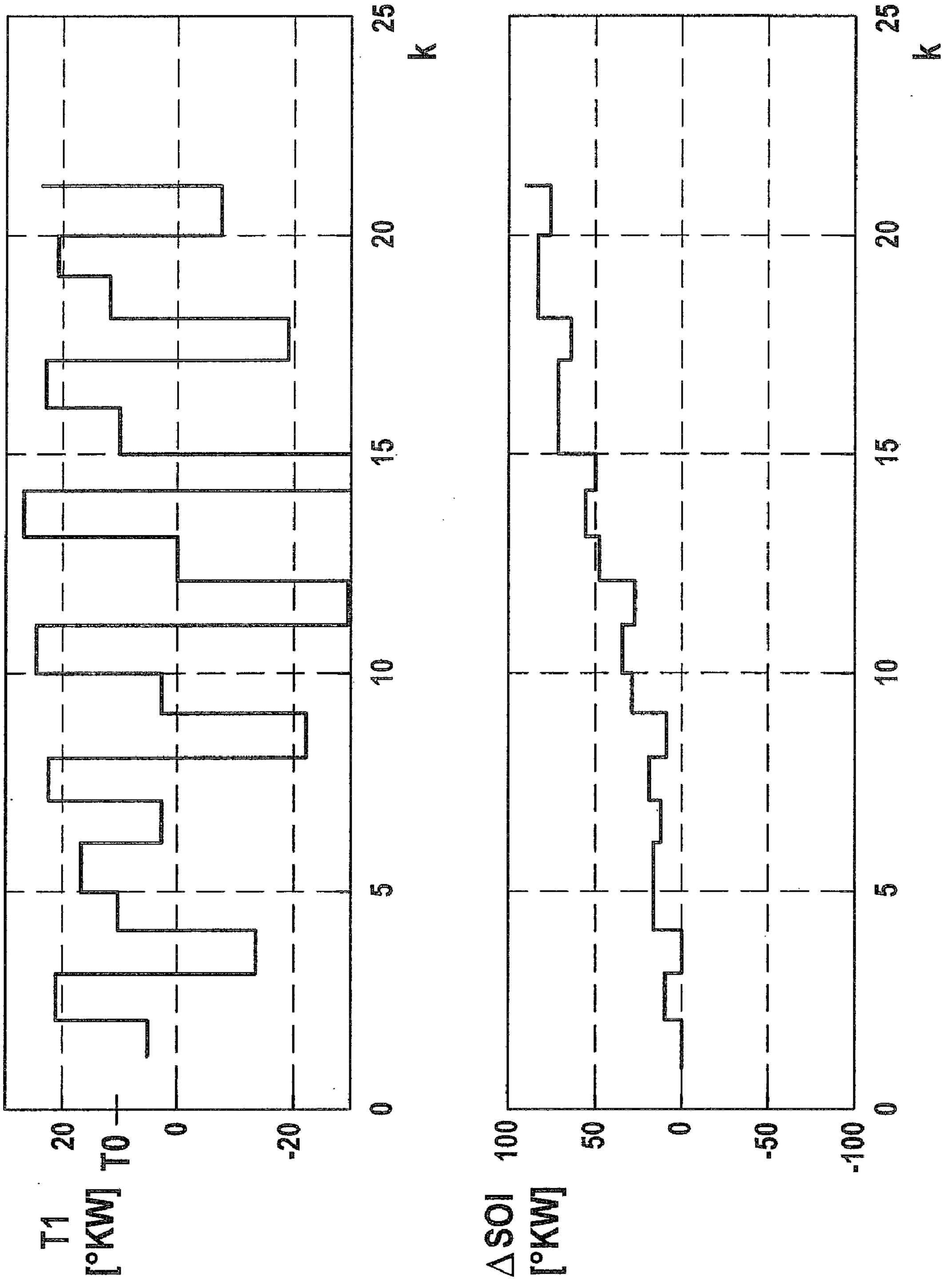
Fig. 4 Prior Art
FIG. 4 shows two graphs representing the effects of a first conventional method for controlling a self-igniting internal combustion engine.

FIG. 4 shows two graphs representing the effects of a first conventional method for controlling a self-igniting internal combustion engine. Corresponding to FIG. 3, the abscissas represent cycles k and the ordinates represent the associated actual combustion positions T1 and correction values ΔSOI.

The first conventional method for controlling a self-igniting internal combustion engine determines correction value ΔSOI as a function of a deviation of a measured actual combustion position T1 from target combustion position T0. However, the first conventional method does not take into account the cycle-to-cycle correlation. Thus, in the first conventional method it is not taken into account that the too-late or too-early occurrence of an actual combustion position T1 already has an effect on the combustion position of the immediately following combustion cycle.

As can be seen clearly on the basis of the graphs shown in FIG. 4, the first conventional method is not suitable for controlling the determined actual combustion position T1 to a prespecified target combustion position T0. Instead, in the first conventional method, during most cycles k actual combustion positions T1 occur that are either too early or too late. Particularly often, too-early and too-late combustion positions T1 alternate. At the same time, correction value ΔSOI assumes higher and higher magnitudes, so that the self-igniting internal combustion engine becomes increasingly out-of-control, and can no longer be controlled.

Figure 5:
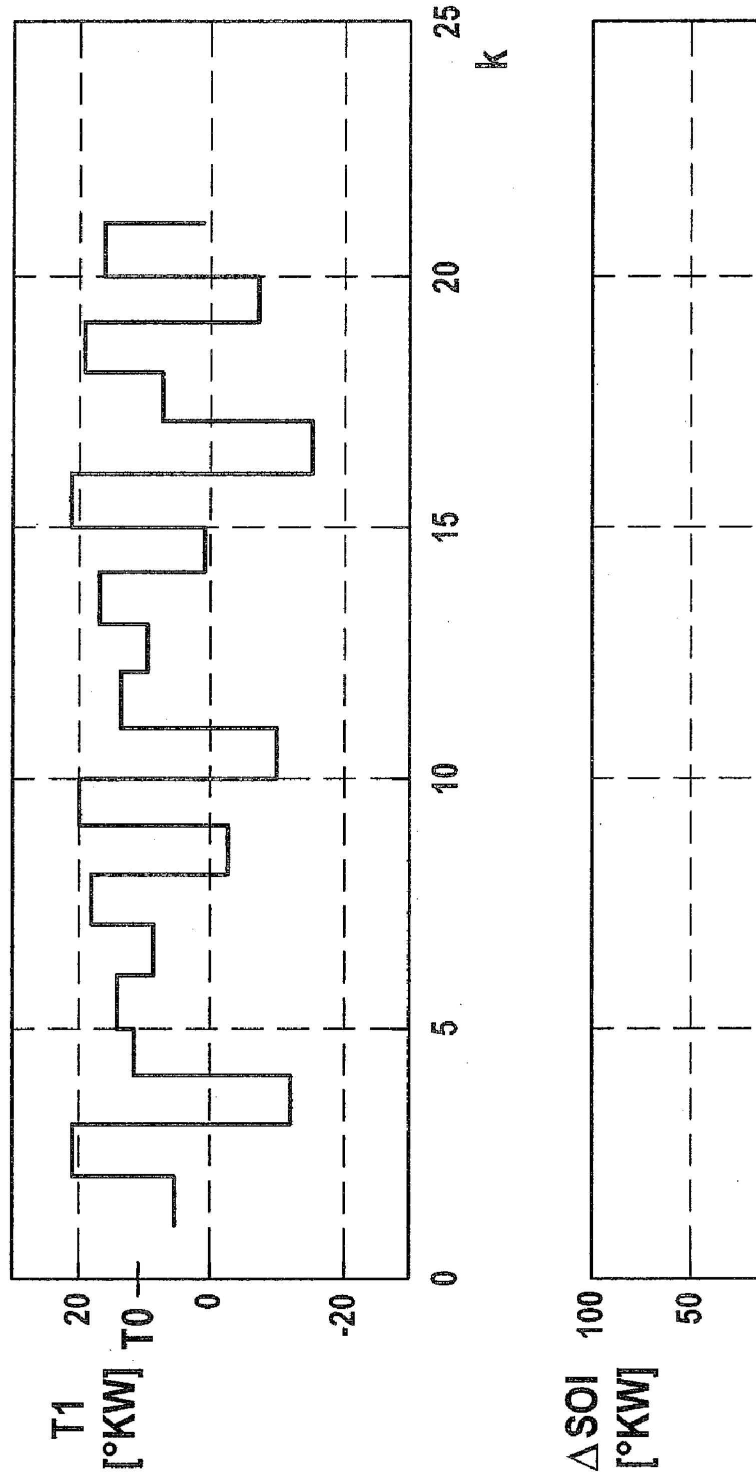
FIG. 5 shows two graphs representing the effects of a second conventional method for controlling a self-igniting internal combustion engine.

FIG. 5 shows two graphs representing the effects of a second conventional method for controlling a self-igniting internal combustion engine. As shown in FIGS. 3 and 4, the abscissas represent cycles k and the ordinates represent the associated actual combustion positions T1 and correction values ΔSOI.

In the second conventional method for controlling a self-igniting internal combustion engine, correction value ΔSOI is constantly set equal to zero. No corrective intervention in the engine control system takes place.

Thus, in the second conventional method there is no risk that correction value ΔSOI will assume higher and higher values. However, it is not possible with the second conventional method to maintain a prespecified target combustion position T0. Instead, the determined actual combustion position T1 deviates from target combustion position T0 in every cycle k. However, the deviations in FIG. 5 are smaller than the deviations in FIG. 4. Thus, in contrast to the first conventional method, the second conventional method does not have an additional destabilizing effect on the combustion process.

Figure 6:
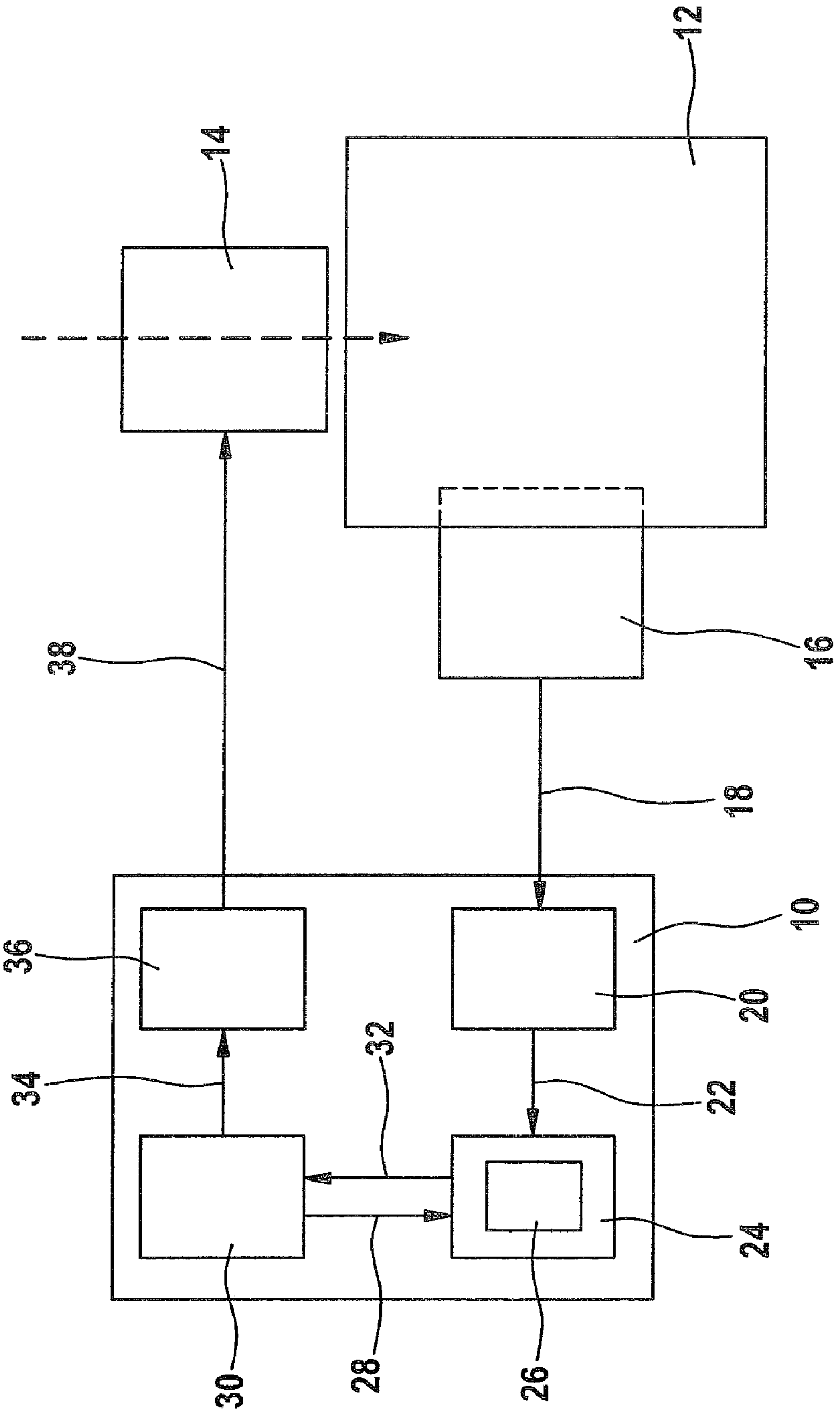
FIG. 6 shows a schematic illustration of an example embodiment of the control device for operating a self-igniting internal combustion engine.

FIG. 6 shows a schematic representation of an example embodiment of the control device for operating a self-igniting internal combustion engine. Control device 10, explained on the basis of FIG. 6, can be situated close to a self-igniting internal combustion engine 12 having an injector 14 and a cylinder pressure sensor 16. Alternatively, control device 10 can also be a component of a central vehicle control system.

Cylinder pressure sensor 16 is designed to measure the pressure prevailing inside the individual cylinders of internal combustion engine 12 with a relatively high time resolution. A corresponding sensor signal 18 is subsequently outputted to control device 10.

Control device 10 has a receive device 20 for receiving sensor signal 18. In addition, receive unit 20 determines, on the basis of the measured pressure and the rotational speed D also supplied to it, the respective actual combustion position of the individual cylinders. Receive device 20 subsequently outputs an actual combustion position signal 22, corresponding to sensor signal 18, to a computing device 24.

On computing device 24 there is stored a computing model 26 for calculating a following combustion position as a function of the received actual combustion position. Computing device 24 is designed to calculate the following combustion position on the basis of the received actual combustion position, using computing model 26. For this purpose, computing device 24 can also take into account at least one initial value for a preferred injection position in the calculation of the following combustion position. The injection position is understood to be for example the time of a main injection. The respective initial value is provided to computer device 24 by an evaluation device 30 via an operating quantity signal 28. In a particular specific embodiment, evaluation device 30 can be designed to determine a speed and/or a load of the associated vehicle, and to provide the initial value of the injection position as a function of the speed and/or of the load.

Computer device 24 subsequently outputs the calculated following combustion position to evaluation device 30 as a following combustion position signal 32. Evaluation device 30 compares the following combustion position, received with following combustion position signal 32, with a target combustion position. The target combustion position is selected so that it corresponds to a preferred combustion position of self-igniting internal combustion engine 12. Here, evaluation device 30 can also be designed to determine the target combustion position as a function of the current speed and the current load of the vehicle.

If, during the comparison of the following combustion position with a target combustion position, evaluation device 30 determines that the received following combustion position is within a predetermined range of deviation around the target combustion position, it determines that the associated initial value of the injection position has been taken over for the coming cycle. An injection position signal 34 corresponding to the initial value is subsequently provided.

If the following combustion position is situated outside the range of deviation, evaluation device 30 determines a new value for the injection position as a function of the comparison. Here, evaluation device 30 also takes into account—by accessing computing model 26—the cycle-to-cycle correlation between the successive combustion cycles of internal combustion engine 12. The newly determined value is thus determined in such a way that the foreseeable deviation of the following combustion position from the target combustion position is still prevented. The newly determined value is subsequently also outputted as injection position signal 34.

Injection position signal 34 outputted by evaluation device 30 is received by an injector control device 36 of control device 10. Injector control device 36 thereupon controls injector 14, using a control signal 38, in such a way that the injection position determined as suitable by evaluation device 30 is maintained for at least one additional combustion cycle.

In a first example embodiment, injector control device 36 can forward injection position signal 34, received by evaluation device 30, to injector 14 as control signal 38. In this case, injector 14 is designed so that it controls itself as a function of control signal 38 in such a way that the injection position determined by evaluation device 30 is maintained during at least one combustion cycle. In a second specific embodiment, injector control device 36 controls the injector 14 directly using control signal 38.

After the at least one combustion cycle controlled by injector control device 36, an actual combustion position can be newly determined by cylinder pressure sensor 16 and outputted to receive device 20 as sensor signal 18. The process described above can thus be repeated arbitrarily often.

In addition, or alternatively, to the injection position, via control device 10 an injection quantity of the fuel introduced into a cylinder can also be used to control the actual combustion position. In this case, evaluation device 30 also provides an injection quantity, instead of or in addition to an injection position. Computing model 26, stored on computing device 24, then determines the following combustion position as an additional function of at least one initial value for the injection quantity. Subsequently, via control signal 38 injector control device 36 controls the injector 14 in order to maintain the injection quantity recognized as advantageous.

As a development, control device 10 can also be designed to control an air supply valve and/or an exhaust gas valve of internal combustion engine 12. In this case, control device 10 has, instead of or in addition to injector control device 36, an air system control device.

What is claimed is:

1. A method for controlling a self-igniting internal combustion engine, the method comprising:

specifying a target combustion position;

determining at least one actual combustion position cycle of at least one cycle of the internal combustion engine;

specifying a computing model for calculating a following combustion position as a function of the at least one actual combustion position;

calculating the following combustion position using the computing model;

comparing the calculated following combustion position with the specified target combustion position; and determining at least one operating quantity for operating the internal combustion engine for at least one cycle as a function of the comparison of the calculated following combustion position with the specified target combustion position.

2. The method as recited in claim 1, wherein at least one initial value for the at least one operating quantity is predetermined, and wherein the following combustion position is calculated on the basis of the determined actual combustion position and the at least one initial value for the at least one operating quantity using the specified computing model.

3. The method as recited in claim 2, wherein, if the calculated following combustion position lies within a predetermined range of deviation around the target combustion position, the internal combustion engine is operated for the at least one cycle with maintenance of the at least one initial value.

4. The method as recited in claim 2, wherein, if the calculated following combustion position lies outside a predetermined range of deviation around the target combustion position, at least one new value is determined for the at least one operating quantity, and the internal combustion engine is operated for the at least one cycle with maintenance of the at least one new value.

5. The method as recited in claim 2, wherein the at least one operating quantity is at least one of an injector control quantity, an air supply valve control quantity, and an exhaust gas valve control quantity.

6. The method as recited in claim 2, wherein at least one of an engine state quantity and a fuel state quantity is determined, and wherein the following combustion position is calculated using the specified computing model on the basis of the determined actual combustion position and the at least one of the determined engine state quantity and the fuel state quantity.

7. The method as recited in claim 2, wherein an environmental parameter is determined, and wherein the following combustion position is calculated using the specified computing model on the basis of the determined actual combustion position and the determined environmental parameter.

8. The method as recited in claim 1, wherein at least one initial value for the at least one operating quantity is predetermined, wherein the following combustion position is determined based on the determined actual combustion positions of the current and next-to-last cycles and the at least one initial value for the at least one operating quantity using the specified computing model, wherein if the calculated following combustion position lies within a predetermined range of deviation around the target combustion position, the internal combustion engine is operated for the at least one cycle with maintenance of the at least one initial value, and wherein if the calculated following combustion position lies outside a predetermined range of deviation around the target combustion position, at least one new value is determined for the at least one operating quantity, and the internal combustion engine is operated for the at least one cycle with maintenance of the at least one new value.

9. The method as recited in claim 8, wherein the at least one operating quantity is at least one of an injector control quantity, an air supply valve control quantity, and an exhaust gas valve control quantity, wherein at least one of an engine state quantity and a fuel state quantity is determined, and wherein the following combustion position is determined using the specified computing model based on the determined actual combustion positions of the current and next-to-last cycles and the at least one of the determined engine state quantity and the fuel state quantity.

10. The method as recited in claim 8, wherein an environmental parameter is determined, and wherein the following combustion position is determined using the specified computing model based on the determined actual combustion positions of the current and next-to-last cycles and the determined environmental parameter.

11. The method as recited in claim 1, wherein the operating quantity includes at least one of an injection position of the main injection an injection quantity, an air supply and an exhaust valve parameter.

12. A control device for controlling a self-igniting internal combustion engine, comprising:

a receiving device configured to receive a sensor signal and determine an actual combustion position of the internal combustion engine based on the sensor signal;

a computing device including a computer-readable storage medium storing a computing model implemented as a plurality of computer-executable codes configured to calculate a following combustion position as a function of the determined actual combustion position; and an evaluation device configured to: a) compare the calculated following combustion position with a predetermined target combustion position; and b) determine at least one operating quantity for operating the internal combustion engine for at least one cycle based on the comparison of the calculated following combustion position with the predetermined target combustion position.

13. The control device as recited in claim 12, wherein the control device is configured to control the internal combustion engine for at least one cycle in such a way that the at least one determined operating quantity is maintained.

14. The control device as recited in claim 12, wherein the control device is configured to control a gasoline engine.

15. The control device as recited in claim 12, wherein at least one initial value for the at least one operating quantity is predetermined, and wherein the following combustion position is determined based on the determined actual combustion positions of the current and next-to-last cycles and the at least one initial value for the at least one operating quantity using the specified computing model.

16. The control device as recited in claim 15, wherein, if the calculated following combustion position lies within a predetermined range of deviation around the target combustion position, the internal combustion engine is operated for the at least one cycle with maintenance of the at least one initial value.

17. The control device as recited in claim 15, wherein, if the calculated following combustion position lies outside a predetermined range of deviation around the target combustion position, at least one new value is determined for the at least one operating quantity, and the internal combustion engine is operated for the at least one cycle with maintenance of the at least one new value.

18. The control device as recited in claim 15, wherein the at least one operating quantity is at least one of an injector control quantity, an air supply valve control quantity, and an exhaust gas valve control quantity.

19. The control device as recited in claim 15, wherein at least one of an engine state quantity and a fuel state quantity is determined, and wherein the following combustion position is determined using the specified computing model based on the determined actual combustion positions of the current and next-to-last cycles and the at least one of the determined engine state quantity and the fuel state quantity.

20. The control device as recited in claim 15, wherein an environmental parameter is determined, and wherein the following combustion position is determined using the specified computing model based on the determined actual combustion positions of the current and next-to-last cycles and the determined environmental parameter.

21. The control device as recited in claim 12, wherein at least one initial value for the at least one operating quantity is predetermined, wherein the following combustion position is determined based on the determined actual combustion positions of the current and next-to-last cycles and the at least one initial value for the at least one operating quantity using the specified computing model, wherein if the determined following combustion position lies within a predetermined range of deviation around the target combustion position, the internal combustion engine is operated for the at least one cycle with maintenance of the at least one initial value, and wherein if the determined following combustion position lies outside a predetermined range of deviation around the target combustion position, at least one new value is determined for the at least one operating quantity, and the internal combustion engine is operated for the at least one cycle with maintenance of the at least one new value.

22. The control device as recited in claim 21, wherein the at least one operating quantity is at least one of an injector control quantity, an air supply valve control quantity, and an exhaust gas valve control quantity, wherein at least one of an engine state quantity and a fuel state quantity is determined, and wherein the following combustion position is determined using the specified computing model based on the determined actual combustion positions of the current and next-to-last cycles and the at least one of the determined engine state quantity and the fuel state quantity.

23. The control device as recited in claim 21, wherein an environmental parameter is determined, and wherein the following combustion position is determined using the specified computing model based on the determined actual combustion positions of the current and next-to-last cycles and the determined environmental parameter.

24. The control device as recited in claim 12, wherein the operating quantity includes at least one of an injection position of the main injection an injection quantity, an air supply and an exhaust valve parameter.

* * * * *